United States Patent
Tang et al.

(10) Patent No.: US 11,329,768 B2
(45) Date of Patent: May 10, 2022

(54) DATA TRANSMISSION METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventors: Hai Tang, Guangdong (CN); Huei-Ming Lin, South Yarra (AU)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/911,225

(22) Filed: Jun. 24, 2020

(65) Prior Publication Data
US 2020/0328852 A1    Oct. 15, 2020

Related U.S. Application Data

(63) Continuation of application No. PCT/CN2018/111512, filed on Oct. 23, 2018.

(30) Foreign Application Priority Data

Dec. 27, 2017  (WO) ............... PCT/CN2017/119135
Aug. 15, 2018  (WO) ............... PCT/CN2018/100576
Aug. 20, 2018  (WO) ............... PCT/CN2018/101383

(51) Int. Cl.
*H04L 1/18*        (2006.01)
*H04B 17/318*    (2015.01)
(Continued)

(52) U.S. Cl.
CPC ......... *H04L 1/1819* (2013.01); *H04B 7/0626* (2013.01); *H04B 17/318* (2015.01);
(Continued)

(58) Field of Classification Search
None
See application file for complete search history.

(56) References Cited

U.S. PATENT DOCUMENTS

2017/0273128 A1    9/2017   Abedini et al.
2018/0176973 A1    6/2018   Kim et al.
(Continued)

FOREIGN PATENT DOCUMENTS

CN      105813204 A     7/2016
CN      106550316 A     3/2017
(Continued)

OTHER PUBLICATIONS

International Search Report in the international application No. PCT/CN2018/111512, dated Jan. 23, 2019.
(Continued)

*Primary Examiner* — Otis L Thompson, Jr.
(74) *Attorney, Agent, or Firm* — Perkins Coie LLP

(57) ABSTRACT

Disclosed are a data transmission method and device, and a computer storage medium. The method comprises: a first terminal sends a physical sidelink control channel (PSCCH) and/or a physical sidelink shared channel (PSSCH) to a second terminal, the PSCCH or the PSSCH comprising feedback information and/or measurement information.

19 Claims, 3 Drawing Sheets

(51) Int. Cl.

| | | |
|---|---|---|
| *H04W 4/40* | (2018.01) | |
| *H04B 7/06* | (2006.01) | |
| *H04L 5/00* | (2006.01) | |
| *H04L 5/10* | (2006.01) | |
| *H04L 25/02* | (2006.01) | |
| *H04W 24/10* | (2009.01) | |
| *H04W 72/04* | (2009.01) | |
| *H04W 80/02* | (2009.01) | |
| *H04W 92/18* | (2009.01) | |

(52) U.S. Cl.
CPC .......... *H04L 5/0051* (2013.01); *H04L 5/0055* (2013.01); *H04L 5/10* (2013.01); *H04L 25/0226* (2013.01); *H04W 4/40* (2018.02); *H04W 24/10* (2013.01); *H04W 72/0446* (2013.01); *H04W 72/0453* (2013.01); *H04W 80/02* (2013.01); *H04W 92/18* (2013.01)

(56) References Cited

U.S. PATENT DOCUMENTS

| | | | |
|---|---|---|---|
| 2018/0213379 A1 | 7/2018 | Xiong et al. | |
| 2018/0220480 A1 | 8/2018 | Agiwal et al. | |
| 2020/0029318 A1* | 1/2020 | Guo | H04W 4/40 |
| 2020/0195317 A1* | 6/2020 | Yasukawa | H04W 16/28 |
| 2020/0280961 A1* | 9/2020 | Lee | H04W 4/40 |

FOREIGN PATENT DOCUMENTS

| | | |
|---|---|---|
| CN | 106550317 A | 3/2017 |
| CN | 106793092 A | 5/2017 |
| EP | 3242515 A1 | 11/2017 |
| EP | 3242515 A4 | 1/2018 |
| WO | 2016006903 A1 | 1/2016 |
| WO | 2016163972 A1 | 10/2016 |
| WO | 2016200221 A1 | 12/2016 |
| WO | 2017030520 A1 | 2/2017 |

OTHER PUBLICATIONS

International Search Report in the international application No. PCT/CN2017/119135, dated Sep. 25, 2018.
Intel Corporation. "Control Signaling Design Details for V2V Communication" 3GPP TSG RAN WG1 Meeting #84bis R1-162366, Apr. 15, 2016 (Apr. 15, 2016), sections 2-5.
International Search Report in the international application No. PCT/CN2018/101383, dated Nov. 8, 2018.
Huawei, HiSilicon. 3GPP TSG RAN WG1 Meeting #90. R1-1712136, Feedback Information for Sidelink Link Adaptation. Aug. 12, 2017 (Aug. 12, 2017), sections 2.2.
Huawei et al: "Sidelink PHY structure and procedure for NR V2X", 3GPP Draft: R1-1810138, 3rd Generation Partnership Project (3GPP), Mobile Competence Centre 650. Route Deslucioles; F-06921 Sophia-Antipolis Cedex France, vol. RAN WG1 29 Sep. 2018 (Sep. 29, 2018), pp. 1-15, XP051517553.
Supplementary European Search Report in the European application No. 18896745.9, dated Dec. 17, 2020.
First Office Action of the Canadian application No. 3086801, dated Dec. 16, 2020.
Written Opinion of the International Search Authority in the international application No. PCT/CN2018/111512, dated Jan. 23, 2019.
Written Opinion of the International Search Authority in the international application No. PCT/CN2017/119135, dated Sep. 25, 2018.
Written Opinion of the International Search Authority in the international application No. PCT/CN/2018101383, dated Nov. 8, 2018.
Office Action of the Indian application No. 202027031506, dated Aug. 23, 2021. 7 pages with English translation.
First Office Action of the European application No. 18896745.9, dated Oct. 13, 2021. 6 pages.
Second Office Action of the Canadian application No. 3086801, dated Nov. 2, 2021. 4 pages.

* cited by examiner

DATA TRANSMISSION METHOD AND DEVICE, AND COMPUTER STORAGE MEDIUM

CROSS REFERENCE TO RELATED APPLICATIONS

This application is a continuation of International Patent Application No. PCT/CN2018/111512 filed on Oct. 23, 2018, which claims priority to Chinese Patent Applications No. PCT/CN2017/119135 filed on Dec. 27, 2017, No. PCT/CN2018/100576 filed on Aug. 15, 2018, and No. PCT/CN2018/101383 filed on Aug. 20, 2018. The disclosures of these applications are hereby incorporated by reference in their entirety.

BACKGROUND

A Sidelink (SL) transmission technology based on Long Term Evolution (LTE) Device to Device (D2D) is adopted for a Vehicle-to-Everything (V2X) system. Unlike receiving or sending communication data through a base station in conventional LTE system, a V2X system adopts a D2D communication manner, so that a higher spectrum efficiency and a lower transmission delay can be achieved.

In the 3rd Generation Partnership Project (3GPP) Rel-14, a V2X technology is standardized, and two transmission modes are defined: a mode 3 and a mode 4. In the mode 3, a transmission resource of a terminal is allocated by a base station. In the mode 4, the terminal determines the transmission resource in a combined manner of sensing and reservation.

In New Radio (NR)-V2X, automatic driving is required to be supported, and thus higher requirements, for example, a higher throughput, a lower delay, higher reliability, wider coverage and more flexible resource allocation, are made to data interaction between vehicles. For meeting the requirements, a multi-antenna transmission technology is introduced in the NR-V2X. In the multi-antenna transmission technology, how a sender selects an optimal beam from multiple candidate beams is determined based on an index value, fed back by a receiver, of the optimal beam.

In addition, NR-V2X is required to support various transmission manners, such as unicast, groupcast and broadcast. During unicast transmission, a receiver is required to feed back Acknowledgement (ACK)/Negative Acknowledgement (NACK) information and Channel Quality Indicator (CQI) information, and a sender may perform Modulation and Coding Scheme (MCS) regulation and determine whether retransmission is required and the like according to the feedback information of the receiver.

In view of this, how to design a feedback channel to transmit feedback information in the NR-V2X is a problem to be solved.

SUMMARY

The disclosure relates to the technical field of wireless communication, and particularly to a data transmission method and device, and a computer storage medium.

The embodiments of the disclosure provide a data transmission method, which may include the following operations. A first terminal receives at least one of data or measurement signal sent by a second terminal; and sends to a second terminal at least one of: a Physical Sidelink Control Channel (PSCCH), a Physical Sidelink Shared Channel (PSSCH) or a Physical Sidelink feedback Channel (PSFCH), the PSCCH, the PSSCH or the PSFCH including at least one of feedback information or measurement information.

The embodiments of the disclosure provide a data transmission device, which may be applied to a first terminal and include one or more processors, a memory configured to store instructions executable by the one or more processors, and a transceiver. The one or more processors are configured to control the transceiver to receive at least one of data or measurement signal sent by a second terminal, and send to the second terminal at least one of: a PSCCH, a PSSCH or a PSFCH, the PSCCH, the PSSCH or the PSFCH including at least one of feedback information or measurement information.

The embodiments of the disclosure provide a computer storage medium, in which computer-executable instructions may be stored, where the computer-executable instructions, when being executed by a processor, enable the processor to implement the data transmission method as mentioned above.

In the technical solutions of the embodiments of the disclosure, the first terminal sends the PSCCH and/or the PSSCH to the second terminal, the PSCCH or the PSSCH including the feedback information and/or the measurement information. Through the technical solutions of the embodiments of the disclosure, the feedback information and/or the measurement information is carried in the PSCCH or the PSSCH for transmission, so as to avoid design of a new feedback channel. In addition, a feedback terminal (i.e., the first terminal) may determine a transmission resource for a feedback channel (i.e., the PSCCH or the PSSCH) in a resource sensing manner or determine the transmission resource for the feedback channel (i.e., the PSCCH or the PSSCH) according to the transmission resource for the data or measurement signal sent by the second terminal.

BRIEF DESCRIPTION OF THE DRAWINGS

The drawings described herein are adopted to provide a further understanding to the disclosure and form a part of the disclosure. Schematic embodiments of the disclosure and descriptions thereof are adopted to explain the disclosure and not intended to form improper limits to the disclosure. In the drawings.

DETAILED DESCRIPTION

In order to make the characteristics and technical contents of the embodiments of the disclosure understood in more detail, implementation of the embodiments of the disclosure will be described below in combination with the drawings in detail. The appended drawings are only adopted for description as references and not intended to limit the embodiments of the disclosure.

Terms used in the present disclosure are not intended to limit the present disclosure but only to describe a purpose of a specific embodiment. The terms "A", "said" and "the", used in the present disclosure and the appended claims, indicating a singular form are also intended to include a plural form unless other meanings are clearly represented in the context. It also should be understood that the term "and/or" used in the present disclosure refers to and includes any or all possible combinations of one or more associated listed items.

For conveniently understanding the technical solutions of the embodiments of the disclosure, a mode 3 and mode 4 in V2X will be explained and described below respectively.

Figure 1:
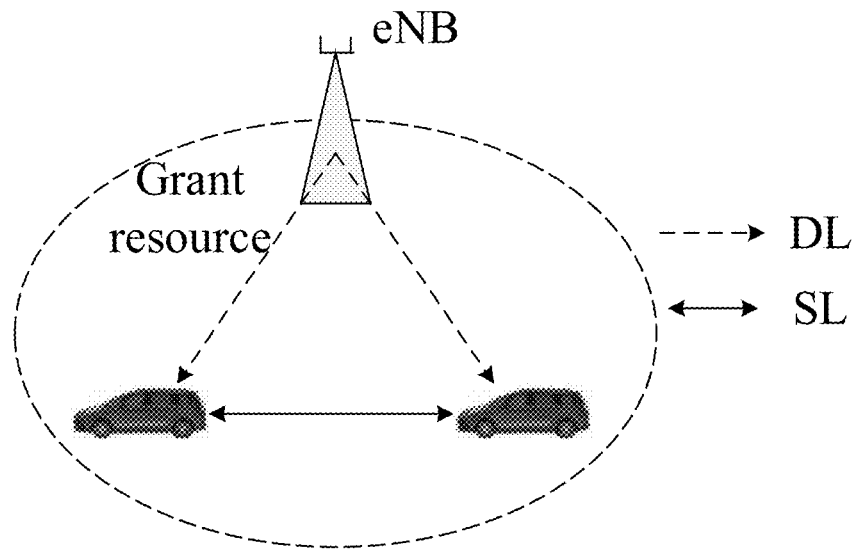
FIG. 1 is a schematic diagram of a scenario of a mode 3 in V2X.

For the mode 3, as shown in FIG. 1, a transmission resource of a vehicle terminal is allocated by a base station (for example, an Evolved NodeB (eNB) in LTE). Specifically, the base station transmits a control message for indicating a grant resource to the vehicle terminal through a Down Link (DL), and then the vehicle terminal sends data in an SL according to the resource allocated by the base station. In the mode 3, the base station may allocate a resource for single transmission to the vehicle terminal and may also allocate a resource for semi-persistent transmission to the terminal.

Figure 2:
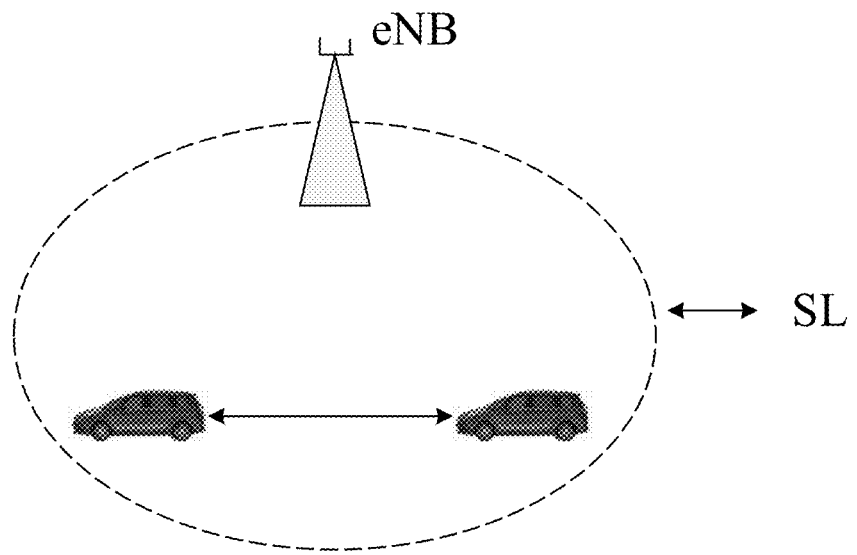
FIG. 2 is a schematic diagram of a scenario of a mode 4 in V2X.

For the mode 4, as shown in FIG. 2, the vehicle terminal adopts a combined transmission manner of sensing and reservation. The vehicle terminal acquires an available transmission resource set in a resource pool through a sensing manner, and the vehicle terminal randomly selects a resource for data transmission from the acquired transmission resource set. Since a service in a V2X system is periodic, the vehicle terminal usually adopts a semi-persistent transmission manner, namely the vehicle terminal, after selecting a transmission resource, may persistently use the transmission resource in multiple transmission cycles, so that probabilities of resource reselection and resource conflict are reduced. The vehicle terminal may carry information for reserve of a resource for next transmission in control information transmitted at present transmission, such that other terminals may detect the control information of the vehicle terminal to determine whether the resource is reserved for and used by the vehicle terminal, thereby achieving the purpose of reducing resource conflicts.

It is to be noted that, in LTE-V2X, the mode 3 is adopted to represent that the transmission resource of the vehicle terminal is allocated by the base station and the mode 4 is adopted to represent that the transmission resource of the vehicle terminal is independently selected by the terminal. In NR-V2X, a new transmission mode may be defined. There are no limits made thereto in the disclosure.

A multi-antenna transmission technology is required to be introduced in the NR-V2X, adoption of multiple antennae may achieve the following advantages.

Firstly, a higher transmission rate is obtained. By using a multi-antenna multiplexing transmission manner, multiple data streams may be transmitted on the same time-frequency resource, so that the transmission rate is increased.

Secondly, a wider coverage and a higher reliability are achieved. By using a beamforming technology, energy may be concentrated in a narrow beam, so that a Signal to Interference plus Noise Ratio (SINR) of a receiver may be increased, and thus a receiving success probability of the receiver may be improved or a transmission distance may be prolonged.

Herein, the coverage and reliability may be improved by beamforming. How a sender selects an optimal beam from multiple candidate beams is implemented through the following process: the sender is required to perform beam scanning and uses different beams for transmission respectively; the receiver receives data transmitted through each beam, thus to select a beam with the best transmission quality as the optimal beam and feed back an index value of the beam to the sender. During subsequent data transmission, the sender may adopt the selected optimal beam for data transmission.

In the abovementioned solution, the receiver feeds back the index value of the beam to the sender; in addition, the receiver is also required to feedback to the sender other types of information, for example, ACK/NACK information and CQI information, and the sender may adopt different transmission strategies according to different feedback information. According to the technical solutions of the embodiments of the disclosure, a feedback channel is designed in NR-V2X to transmit feedback information.

Figure 3:
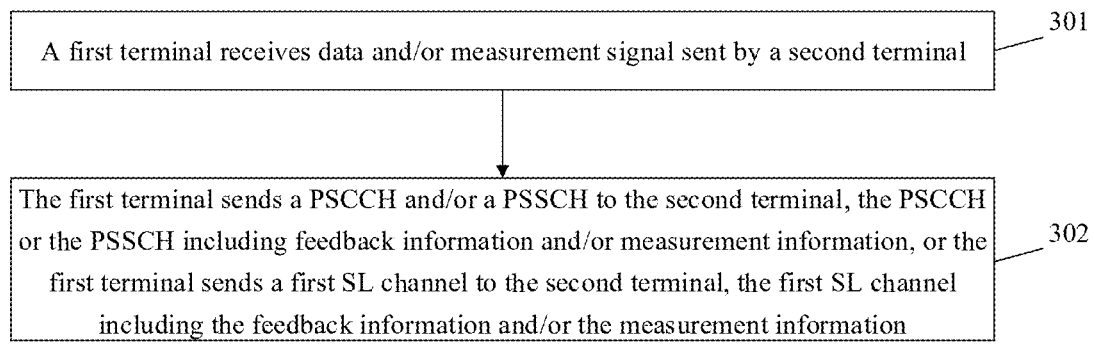
FIG. 3 is a flowchart of a data transmission method according to some embodiments of the disclosure.

FIG. 3 is a flowchart of a data transmission method according to an embodiment of the disclosure. As shown in FIG. 3, the data transmission method includes the following steps.

In 301, a first terminal receives data and/or measurement signal sent by a second terminal.

In some embodiments of the disclosure, types of the first terminal and the second terminal are not limited, and they may be devices such as vehicle terminals, mobile phones and notebook computers.

In some embodiments of the disclosure, the first terminal and the second terminal are arranged in the Internet of vehicles, and the first terminal communicates with the second terminal through a D2D SL. Therefore, the first terminal receives the data and/or measurement signal sent by the second terminal through the SL.

In some embodiments of the disclosure, the measurement signal includes at least one of:

a DMRS, a Channel State Indicator Reference Signal (CSI-RS), a Sounding Reference Signal (SRS) or a Phase Tracking Reference Signal (PT-RS).

In 302, the first terminal sends a PSCCH and/or a PSSCH to the second terminal, the PSCCH or the PSSCH including feedback information and/or measurement information, or the first terminal sends a first SL channel to the second terminal, the first SL channel including the feedback information and/or the measurement information.

In some embodiments of the disclosure, the feedback information includes feedback information corresponding to the data sent by the second terminal, and the measurement information includes measurement information corresponding to the measurement signal sent by the second terminal.

In some embodiments of the disclosure, the operation that the first terminal sends the feedback information and/or the measurement information to the second terminal may be implemented in the following three manners.

In a first manner, the first terminal carries the feedback information and/or the measurement information in the PSCCH and transmits the same to the second terminal.

In a second manner, the first terminal carries the feedback information and/or the measurement information in the PSSCH and transmits the same to the second terminal.

In a third manner, the first terminal carries the feedback information and/or the measurement information in the first SL channel and transmits the same to the second terminal. Furthermore, the first SL channel is an SL channel different from the PSCCH and the PSSCH, and the SL channel is used to transmit the feedback information. Furthermore, the first SL channel is called a physical SL feedback channel (PSFCH). Optionally, the first SL channel occupies last K symbols in a subframe, $1<=K<14$. Optionally, the first SL channel and the data and/or SL signal received from the second terminal by the first terminal are positioned in the same subframe or slot. For example, the data sent to the first terminal by the second terminal occupies first 8 time-domain symbols of a subframe, the first terminal receives the data and sends feedback information for the data in the first SL channel, where the first SL channel occupies last 4 time-domain symbols of the subframe.

In the abovementioned solution, the feedback information includes at least one of:

ACK/NACK information, beam index information, CQI information, PMI information, RI information, power indication information or CSI information.

Herein, the power indication information is used to indicate increased power or decreased power. Or, the power indication information may be a power head room, and the power head room may also be used to indicate the increased power or the decreased power. Or, the power indication information may be transmission power information for transmission of the PSCCH or the PSSCH by the first terminal.

Herein, the ACK/NACK information refers to ACK information or NACK information.

Optionally, in the abovementioned solution, the measurement information includes at least one of:

Reference Signal Received Power (RSRP), Reference Signal Received Quality (RSRQ), Received Signal Strength Indication (RSSI), interference indication information or path loss information.

Optionally, in the abovementioned solution, the RSRP is RSRP of the SL, the RSRQ is RSRQ of the SL, the RSSI is an RSSI of the SL, the interference indication information is used to indicate interference of the SL, and the path loss information represents path loss of the SL between the first terminal and the second terminal. The technical solution of the embodiment of the disclosure will be described below in combination with specific application examples in detail.

First Application Example

The first terminal carries the feedback information and/or the measurement information in the PSCCH for and transmits them to the second terminal, i.e., the PSCCH includes the feedback information and/or the measurement information.

Specifically, the first terminal sends the feedback information and/or the measurement information to the second terminal through SCI in the PSCCH, the SCI including the feedback information and/or the measurement information.

Herein, a new SCI format is designed to carry the feedback information. Furthermore, when the feedback information includes the ACK/NACK information, the feedback information further includes HARQ process information.

In an implementation mode, the PSCCH further includes at least one of identification information of a first terminal, identification information of the second terminal or group identification information. Furthermore, the identification information of the first terminal is carried in the SCI in the PSCCH; or, the identification information of the second terminal is carried in the SCI in the PSCCH; or, the group identification information is carried in the SCI in the PSCCH. For example, the SCI includes a first information field for indicating the identification information of the first terminal, and/or the identification information of the second terminal and/or the group identification information. The group identification information may be identification information used for distinguishing between different groups or different service types during groupcast communication of the first terminal and the second terminal.

In an implementation mode, after channel coding is performed on an information bit of the SCI carried in the PSCCH, a scrambling operation is executed on the coded sequence to obtain a scrambling sequence, where the scrambling sequence may be used to determine at least one of the identification information of the first terminal, the identification information of the second terminal or the group identification information. For example, the PSCCH sent by the first terminal carries the SCI, a sequence obtained after channel coding and rate matching on the information bit of the SCI is a first sequence, the first terminal perform the scrambling operation on the first sequence, and a scrambling sequence for the scrambling operation may be a first scrambling sequence determined according to the identification information of the first terminal, and/or the identification information of the second terminal and/or the group identification information. The second terminal receives the PSCCH sent by the first terminal, descrambles the SCI in the PSCCH by use of the first scrambling sequence, and may determine, in case of successful decoding, the identification information of the first terminal, and/or the identification information of the second terminal and/or the group identification information according to the first scrambling sequence.

In an implementation mode, after addition of Cyclic Redundancy Check (CRC) on the information bit of the SCI carried in the PSCCH, the scrambling operation is to be executed on the encoded sequence, and the scrambling sequence or mask sequence for scrambling may be used to determine at least one of the identification information of the first terminal, the identification information of the second terminal or the group identification information. For example, the PSCCH sent by the first terminal carries SCI, and the sequence of the information bit, obtained after the addition of CRC, of the SCI is a second sequence, the first terminal performs scrambling operation on the second sequence, and the scrambling sequence or mask sequence for the scrambling operation is a second scrambling sequence determined according to the identification information of the first terminal, and/or the identification information of the second terminal and/or the group identification information. The second terminal receives the PSCCH sent by the first terminal, descrambles the SCI in the PSCCH by use of the second scrambling sequence and, and when decoding is successful, the second terminal may determine the identification information of the first terminal, and/or the identification information of the second terminal and/or the group identification information according to the second scrambling sequence.

In an implementation mode, the SCI in the PSCCH includes the feedback information and/or the measurement information, and the PSSCH scheduled by the SCI includes at least one of the identification information of the first terminal, the identification information of the second terminal or the group identification information.

It is to be understood that, in the embodiments, the identification information of the first terminal, and/or the identification information of the second terminal and/or the group identification information being indicated through the information field in the SCI, the identification information of the first terminal, and/or the identification information of the second terminal and/or the group identification information being determined through the scrambling sequence or mask sequence corresponding to the PSCCH, and the identification information of the first terminal, and/or the identification information of the second terminal and/or the group identification information being included in the PSSCH scheduled by the SCI may be used in combination. There are no limits made thereto in the disclosure. For example, the first information field in the SCI is used to indicate the identification information of the first terminal, and the identification information of the second terminal is determined through the scrambling sequence corresponding to the PSCCH. For another example, the first information field in the SCI is used to indicate the identification information of the first terminal, and the PSSCH scheduled by the SCI includes the identification information of the second terminal.

In the above solution, the SCI includes no resource scheduling information. Herein, the resource scheduling information is used to indicate a scheduled time-domain resource and/or frequency-domain resource.

In an implementation mode, the SCI includes first indication information, and the first indication information is used to indicate that the SCI includes the feedback information and/or the measurement information, or the first indication information is used to indicate an SCI format.

For example, the SCI includes a bit, when a value of the bit is 1, the SCI is used to transmit the feedback information and/or the measurement information, and when the value of the bit is 0, the SCI is used to schedule a resource of the PSSCH.

For another example, the SCI includes a bit, when a value of the bit is 1, the SCI is SCI in a first format, and when the value of the bit is 0, the SCI is SCI in a second format. The SCI in the first format is used to transmit the feedback information and/or the measurement information, and the SCI in the second format is used to transmit scheduling information of the PSSCH.

In addition, the embodiments of the disclosure also disclose how to determine a resource of the PSCCH used for transmitting the feedback information, implemented through the following three manners.

In a first manner, the first terminal performs resource sensing, determines at least one available resource and selects from the at least one available resource the resource for transmitting the PSCCH.

Herein, the first terminal selects the resource for the PSCCH in a sensing manner. Specifically, the first terminal determines an available resource set in the sensing manner and selects the resource for transmitting the PSCCH from the available resource set.

In a second manner, the first terminal determines the resource for transmitting the PSCCH based on a transmission resource corresponding to the data sent by the second terminal, or, the first terminal determines the resource for transmitting the PSCCH based on a transmission resource corresponding to the measurement signal sent by the second terminal.

For example, a frequency-domain transmission resource for the PSCCH may be determined by an index of a lowest Physical Resource Block (PRB) or lowest sub-band where the data is located, or determined by an index of a lowest PRB or lowest sub-band where the measurement signal is located. For example, a frequency-domain position of the PSCCH is started from a sub-band A1, and the index of the lowest sub-band where the data is located is B1, where A1=B1+K1 and K1 is a value configured by a network or preconfigured, namely the frequency-domain position of the PSCCH may be determined by a frequency-domain position of the data.

For example, a time-domain transmission resource for the PSCCH may be determined by a subframe where the data is located or determined by a subframe where the measurement signal is located. For example, a time-domain position of the PSCCH is a subframe C1, and the subframe where the data is located is D1, C1=D1+P1 and P1 being a value that is preconfigured or configured by the network, namely a time-domain position of the PSCCH may be determined by a time-domain position of the data.

In a third manner, the first terminal determines the resource for transmitting the PSCCH based on second indication information sent by the second terminal, the second indication information being carried in the data sent by the second terminal or the second indication information being carried in control information corresponding to the data sent by the second terminal.

For example, the second terminal sends data to the first terminal, control information corresponding to the data carries the second indication information, and the second indication information is used to indicate the resource for the feedback information of the data. The first terminal receives the control information and data sent by the second terminal, determines the resource for the feedback information corresponding to the data according to the second indication information in the control information and sends the PSCCH on the resource, the PSCCH carrying the feedback information.

Second Application Example

The first terminal carries the feedback information and/or the measurement information in the PSSCH and transmits the same to the second terminal, i.e., the PSSCH includes the feedback information and/or the measurement information.

In an embodiment, the first terminal sends the feedback information and/or the measurement information to the second terminal through a MAC CE in the PSSCH, the MAC CE including the feedback information and/or the measurement information.

Herein, the feedback information and/or the measurement information is carried in the PSSCH in form of the MAC CE, and the first terminal sends out the feedback information and/or the measurement information at the same time of sending the PSSCH.

In an embodiment the feedback information and/or the measurement information being carried in the PSSCH includes that the feedback information and/or the measurement information is carried in the PSSCH by puncturing part of the resource of the PSSCH. Specifically, data of the PSSCH is mapped to a transmission resource for the PSSCH, a first resource subset is selected from the transmission resource for the PSSCH for the feedback information and/or the measurement information, and the corresponding data of the PSSCH on the first resource subset is punctured, namely the data of the PSSCH on the first resource subset is replaced with the feedback information and/or the measurement information. Furthermore, the first resource subset is determined according to a first criterion. The first criterion includes that: a transmission resource for the feedback information and/or the measurement information is a transmission resource on a DMRS symbol of the PSSCH, and the transmission resource for the feedback information and/or the measurement information may be incapable of occupying a transmission resource for a DMRS of the PSSCH. Or, the first criterion includes that: the transmission resource for the feedback information and/or the measurement information is a transmission resource on a time-domain symbol adjacent to the DMRS symbol of the PSSCH. Furthermore, the transmission resource for the feedback information and/or the measurement information is a resource starting from a lowest or highest frequency-domain position on the DMRS symbol of the PSSCH or the time-domain symbol adjacent to the DMRS symbol. The first criterion is preconfigured, or configured by the network.

Furthermore, a size of the first resource subset is determined by the number of symbols obtained by channel coding and modulation of an information bit of the feedback information and/or the measurement information.

For example, the PSSCH occupies a subframe and occupies 8 PRBS in the frequency domain, the 3rd, 6th, 9th and 12th time-domain symbols in the subframe of the PSSCH are DMRS symbols, and on each DMRS symbol, all resource units are adapted to transmit a DMRS sequence. The first criterion is that the feedback information occupies a resource on a first time-domain symbol after the first DMRS symbol, i.e., a resource starting from a lowest frequency-domain position of a frequency-domain resource for the PSSCH. That is, the feedback information occupies a resource starting from a lowest frequency-domain position on the fourth time-domain symbol of the subframe where the PSSCH is located. If the feedback information is to occupy 20 resource units, data of the PSSCH on 20 resource units starting from a lowest position of the frequency-domain resource occupied by the PSSCH on the fourth time-domain symbol is replaced with the feedback information.

In an embodiment, the feedback information and/or the measurement information being carried in the PSSCH includes that the feedback information and/or the measurement information is carried in the PSSCH in a rate matching manner. Specifically, a size of the resource occupied by the feedback information and/or the measurement information is determined at first. Then, the resource, occupied by the feedback information and/or the measurement information, in the transmission resource for the PSSCH is determined according to the first criterion. When a resource unit available for the data of the PSSCH is calculated, it is necessary to remove the resource reserved for the feedback information and/or the measurement information, and when the data of the PSSCH is mapped to the transmission resource, the data of the PSSCH does not occupy the resource for the feedback information and/or the measurement information. The feedback information and/or the measurement information is mapped to the resource, determined according to the first criterion, in the PSSCH, namely the data of the PSSCH may not be punctured with the feedback information and/or the measurement information.

In an embodiment, different modulation manners or coding manners are adopted for the feedback information and/or the measurement information and the PSSCH.

In an embodiment, different power spectrum densities are adopted for the feedback information and/or the measurement information and the PSSCH, or power factors of the feedback information and/or the measurement information and the PSSCH are different.

In an implementation mode, the PSSCH further includes at least one of the identification information of the first terminal, the identification information of the second terminal or the group identification information. Furthermore, the identification information of the first terminal is carried in the MAC CE of the PSSCH; or, the identification information of the second terminal is carried in the MAC CE of the PSSCH; or, the group identification information is carried in the MAC CE of the PSSCH.

In an implementation mode, after channel coding is performed on an information bit of the data of the PSSCH, a scrambling operation is to be executed on a encoded sequence, and a scrambling sequence may be used to determine at least one of the identification information of the first terminal, the identification information of the second terminal or the group identification information. For example, the sequence obtained by channel coding and rate matching of the data of the PSSCH sent by the first terminal is a first sequence, the first terminal performs scrambling operation on the first sequence, and the scrambling sequence subjected to the scrambling operation is a first scrambling sequence determined according to the identification information of the first terminal, and/or the identification information of the second terminal and/or the group identification information. The second terminal receives the PSSCH sent by the first terminal, descrambles the data of the PSSCH by use of the first scrambling sequence and, when decoding is successful, the second terminal may determine the identification information of the first terminal, and/or the identification information of the second terminal and/or the group identification information according to the first scrambling sequence.

In an implementation mode, the first terminal sends fifth indication information to the second terminal, the fifth indication information being used to indicate at least one of the following information: a type of the feedback information, a number of bits corresponding to the type of the feedback information, a type of the measurement information or a number of bits corresponding to the type of the measurement information. Furthermore, the fifth indication information is included in the PSSCH, or, the fifth indication information is included in the PSCCH corresponding to the PSSCH.

In an implementation mode, the first terminal acquires sixth indication information, the sixth indication information being used to indicate at least one of the following information: a type of the feedback information sent by the first terminal, a number of bits corresponding to the type of the feedback information sent by the first terminal, a type of the measurement information sent by the first terminal or a number of bits corresponding to the type of the measurement information sent by the first terminal. Furthermore, the first terminal may acquire the sixth indication information in the following manners. In the first manner, the first terminal receives a first SL transmission channel sent by the second terminal, the first SL transmission channel including the sixth indication information. Or, in the second manner, the first terminal receives configuration information sent by the network, the configuration information including the sixth indication information.

It is to be understood that, in the abovementioned embodiments, the identification information of the first terminal, and/or the identification information of the second terminal and/or the group identification information being indicated through the MAC CE in the PSSCH and the identification information of the first terminal, and/or the identification information of the second terminal and/or the group identification information being determined through the scrambling sequence corresponding to the PSSCH may be used in combination. There are no limits made thereto in the disclosure. For example, the MAC CE in the PSSCH contains the identification information of the first terminal, and the identification information of the second terminal is determined through the scrambling sequence corresponding to the PSSCH.

It is to be understood that the identification information of the first terminal, and/or the identification information of the second terminal and/or the group identification information may be carried in the PSSCH through the puncturing or rate matching manner for the feedback information and/or the measurement information as described in the method embodiment, and an adopted method is the same as that in the abovementioned embodiment and will not be elaborated herein.

In the embodiments of the disclosure, if the first terminal has no data to be transmitted, the first terminal sends a data-free PSSCH, the PSSCH containing the feedback information and/or the measurement information. Furthermore, when the feedback information includes the ACK/NACK information, the feedback information further includes the HARQ process information.

In addition, the embodiments of the disclosure also disclose how to determine a resource of the PSSCH for transmitting the feedback information and/or the measurement information, implemented through the following three manners.

In a first manner, the first terminal performs resource sensing, determines the at least one available resource and selects the resource for transmitting the PSSCH from the at least one available resource.

Herein, the first terminal selects the resource for the PSSCH in the sensing manner. Specifically, the first terminal determines the available resource set in the sensing manner and selects the resource for transmitting the PSSCH from the available resource set.

In a second manner, the first terminal determines the resource for transmitting the PSSCH based on the transmission resource corresponding to the data sent by the second terminal, or, the first terminal determines the resource for transmitting the PSSCH based on the transmission resource corresponding to the measurement signal sent by the second terminal.

For example, a frequency-domain transmission resource for the PSSCH may be determined by the index of the lowest PRB or lowest sub-band where the data is located or is determined by an index of the lowest PRB or an index of the lowest sub-band where the measurement signal is located. For example, a frequency-domain starting position of the PSSCH is a sub-band A2, and the index of the lowest sub-band where the data is located is B2, A2=B2+K2 and K2 being a value configured by the network or preconfigured, namely the frequency-domain position of the PSSCH may be determined by the frequency-domain position of the data.

For example, a time-domain transmission resource for the PSSCH may be determined by the subframe where the data is located or determined by the subframe where the measurement signal is located. For example, a time-domain position of the PSSCH is a subframe C2, and the subframe in which the data is located is D2, C2=D2+P2 and P2 being a value configured by the network or preconfigured, namely a time-domain position of the PSSCH may be determined by the time-domain position of the data.

In a third manner, the first terminal determines the resource for transmitting the PSSCH based on third indication information sent by the second terminal, the third indication information being carried in the data sent by the second terminal or the third indication information being carried in the control information corresponding to the data sent by the second terminal.

For example, the second terminal sends the data to the first terminal, the control information corresponding to the data contains the third indication information, and the third indication information is configured to indicate a resource occupied by feedback information for the data. The first terminal receives the control information and data sent by the second terminal, determines a resource for the feedback information corresponding to the data according to the third indication information in the control information, and sends the PSSCH on the resource, the PSSCH containing the feedback information.

Third Application Example

The first terminal carries the feedback information and/or the measurement information in the first SL channel and transmits the same to the second terminal. The first SL channel is not the PSCCH or the PSSCH and is only configured to transmit the feedback information and/or the measurement information.

In an implementation mode, the first SL channel is a sequence for carrying the feedback information and/or SL information. For example, the ACK or NACK information is carried through different sequences, a first sequence is used to represent sending of the ACK information, a second sequence is used to represent sending of the NACK information, and the first terminal determines the sequence to be transmitted according to information (ACK or NACK) to be fed back.

In addition, the embodiments of the disclosure also disclose how to determine a resource for the first SL channel for transmitting the feedback information and/or the measurement information, implemented through the following three manners.

In a first manner, the first terminal performs resource sensing, determines the at least one available resource, and selects the resource for transmitting the first SL channel from the at least one available resource.

Herein, the first terminal selects the resource for the first SL channel in the sensing manner. Specifically, the first terminal determines the available resource set in the sensing manner and selects the resource for transmitting the first SL channel from the available resource set.

In a second manner, the first terminal determines the resource for transmitting the first SL channel based on the transmission resource corresponding to the data sent by the second terminal, or, the first terminal determines the resource for transmitting the first SL channel based on the transmission resource corresponding to the measurement signal sent by the second terminal.

For example, a frequency-domain transmission resource for the first SL channel may be determined by an index of the lowest PRB or an index of the lowest sub-band where the data is located or determined by the index of the lowest PRB or the index of the lowest sub-band where the measurement signal is located. For example, a frequency-domain starting position of the first SL channel is a sub-band A3, and the index of the lowest sub-band where the data is located is B3, A3=B3+K3 and K3 being a value configured by the network or preconfigured, namely a frequency-domain position of the first SL channel may be determined by the frequency-domain position of the data.

For example, a time-domain transmission resource for the first SL channel may be determined by the subframe where the data is located or determined by the subframe where the measurement signal is located. For example, a time-domain position of the first SL channel is a subframe C3, and the subframe where the data is located is D3, C3=D3+P3 and P3 being a value configured by the network or preconfigured, namely the time-domain position of the first SL channel may be determined by the time-domain position of the data.

For example, the first SL channel is a sequence which occupies a time-domain symbol, and a transmission resource for transmitting the sequence may be determined by a subframe where the data is located. For example, a last time-domain symbol of the subframe where the data is located is used for the sequence, a starting position (or an ending position) of a frequency-domain resource for the sequence is the same as a starting position (or an ending position) of a frequency-domain resource for the data, and a size of the frequency-domain resource occupied by the sequence may be preconfigured, or configured by the network, or determined according to a size of the frequency-domain resource for the data.

In a third manner, the first terminal determines the resource for transmitting the first SL channel based on fourth indication information sent by the second terminal, the fourth indication information being carried in the data sent by the second terminal or the fourth indication information being carried in control information corresponding to the data sent by the second terminal.

For example, the second terminal sends the data to the first terminal, the control information corresponding to the data contains the fourth indication information, and the fourth indication information is used to indicate the resource for the feedback information for the data. The first terminal receives the control information and data sent by the second terminal, determines a resource for the feedback information corresponding to the data according to the fourth indication information in the control information, and sends the first SL channel on the resource, the first SL channel containing the feedback information.

Figure 4:
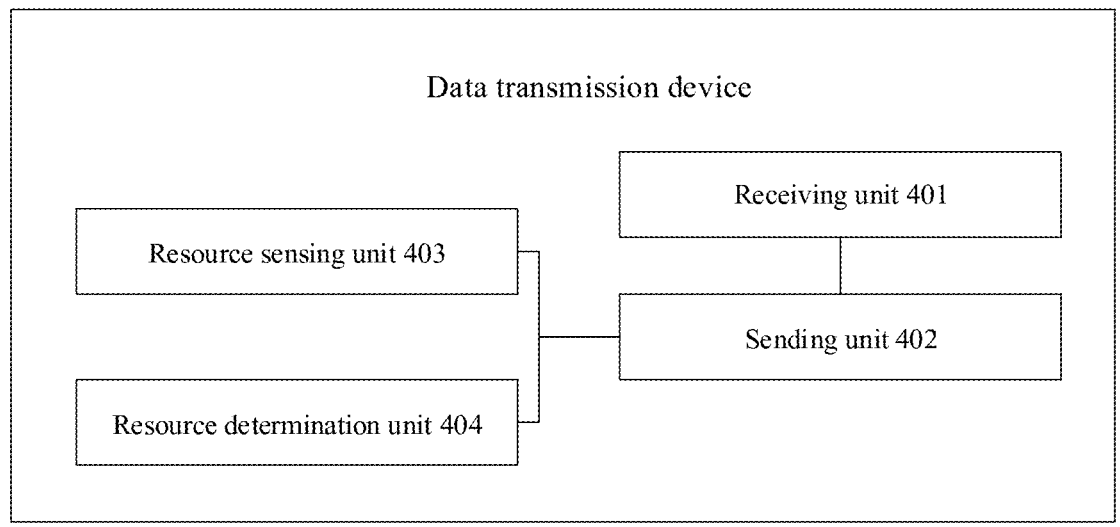
FIG. 4 is a structure composition diagram of a data transmission device according to some embodiments of the disclosure.

FIG. 4 is a structure composition diagram of a data transmission device according to embodiments of the disclosure. As shown in FIG. 4, the data transmission device includes a sending unit 402.

The sending unit 402 is configured to send a PSCCH and/or a PSSCH to a second terminal, the PSCCH or the PSSCH including feedback information and/or measurement information.

The device further includes a receiving unit 401 configured to receive data and/or measurement signal sent by the second terminal.

In some embodiments, the measurement signal includes at least one of: a DMRS, a CSI-RS, an SRS or a PT-RS.

In some embodiments, the feedback information is feedback information corresponding to the data sent by the second terminal, and the measurement information is measurement information corresponding to the measurement signal sent by the second terminal.

In an implementation mode, under the condition that the PSCCH includes the feedback information and/or the measurement information, the sending unit 402 is configured to send the feedback information and/or the measurement information to the second terminal through SCI in the PSCCH, the SCI including the feedback information and/or the measurement information.

In an implementation mode, the PSCCH further includes at least one of identification information of a first terminal, identification information of the second terminal or group identification information. Furthermore, the identification information of the first terminal is carried in the SCI of the PSCCH; or, the identification information of the second terminal is carried in the SCI of the PSCCH; or, the group identification information is carried in the SCI of the PSCCH.

In an implementation mode, the PSCCH further including at least one of the identification information of the first terminal, the identification information of the second terminal or the group identification information includes the following condition.

A scrambling sequence corresponding to the PSCCH is used to determine at least one of the identification information of the first terminal, the identification information of the second terminal or the group identification information.

In an implementation mode, the PSCCH further including at least one of the identification information of the first terminal, the identification information of the second terminal or the group identification information includes the following condition.

A mask sequence corresponding to the SCI in the PSCCH is used to determine at least one of the identification information of the first terminal, the identification information of the second terminal or the group identification information.

In an implementation mode, the SCI includes no resource scheduling information.

In an implementation mode, the SCI includes first indication information, and the first indication information is used to indicate that the SCI includes the feedback information and/or the measurement information, or the first indication information is used to indicate an SCI format.

In an implementation mode, the sending unit 402 is further configured to send fifth indication information to the second terminal, the fifth information being used to indicate at least one of the following information:

a type of the feedback information, a number of bits corresponding to the type of the feedback information, a type of the measurement information and a number of bits corresponding to the type of the measurement information.

In an implementation mode, the fifth indication information is included in the PSSCH, or, the fifth indication information is included in the PSCCH corresponding to the PSSCH.

In an implementation mode, the device further includes the receiving unit 401 configured to acquire sixth indication information, the sixth indication information being used to indicate at least one of the following information:

a type of the feedback information sent by the first terminal, a number of bits corresponding to the type of the feedback information sent by the first terminal, a type of the measurement information sent by the first terminal and a number of bits corresponding to the type of the measurement information sent by the first terminal.

In an implementation mode, the receiving unit 401 is configured to receive a first SL transmission channel sent by the second terminal, the first SL transmission channel including the sixth indication information.

In an implementation mode, the receiving unit 401 is configured to receive configuration information sent by a network, the configuration information including the sixth indication information.

In an implementation mode, the device further includes a resource sensing unit 403 configured to perform resource sensing, determine at least one available resource and select a resource for transmitting the PSCCH from the at least one available resource.

In an implementation mode, the device further includes a resource determination unit 404 configured to determine the resource for transmitting the PSCCH based on a transmission resource corresponding to the data sent by the second terminal, or determine the resource for transmitting the PSCCH based on a transmission resource corresponding to the measurement signal sent by the second terminal.

In an implementation mode, the device further includes the resource determination unit 404 configured to determine the resource for transmitting the PSCCH based on second indication information sent by the second terminal, the second indication information being carried in the data sent by the second terminal or the second indication information being carried in control information corresponding to the data sent by the second terminal.

In an implementation mode, under the condition that the PSSCH includes the feedback information and/or the measurement information, the sending unit 402 is configured to send the feedback information and/or the measurement information to the second terminal through a MAC CE in the PSSCH, the MAC CE including the feedback information and/or the measurement information.

In an implementation mode, under the condition that the PSSCH includes the feedback information and/or the measurement information, the feedback information and/or the measurement information may occupy a first resource subset of a transmission resource for the PSSCH, the first resource subset being determined according to a first criterion configured by a network or preconfigured.

In an implementation mode, the first criterion includes that:

a transmission resource for the feedback information and/or the measurement information is a transmission resource on a DMRS symbol of the PSSCH and the transmission resource for the feedback information and/or the measurement information may not occupy a transmission resource for a DMRS of the PSSCH, or, the transmission resource for the feedback information and/or the measurement information is a transmission resource on a time-domain symbol adjacent to the DMRS symbol of the PSSCH.

In an implementation mode, a size of the first resource subset is determined by the number of symbols obtained by channel coding and modulation of an information bit of the feedback information and/or the measurement information.

In an implementation mode, the feedback information and/or the measurement information occupying the first resource subset of the transmission resource for the PSSCH includes the following condition.

Data of the PSSCH on the first resource subset is punctured or replaced with the feedback information and/or the measurement information.

In an embodiment, under the condition that the PSSCH includes the feedback information and/or the measurement information, the feedback information and/or the measurement information may be carried in the PSSCH in a rate matching manner.

In an implementation mode, the PSSCH further includes at least one of the identification information of the first terminal, the identification information of the second terminal or the group identification information. Furthermore, the identification information of the first terminal is carried in the MAC CE of the PSSCH; or, the identification information of the second terminal is carried in the MAC CE of the PSSCH; or, the group identification information is carried in the MAC CE of the PSSCH.

In an implementation mode, the PSSCH further including at least one of the identification information of the first terminal, the identification information of the second terminal or the group identification information includes the following condition.

A scrambling sequence corresponding to the PSSCH is used to determine at least one of the identification information of the first terminal, the identification information of the second terminal or the group identification information.

It is to be understood that the identification information of the first terminal, and/or the identification information of the second terminal and/or the group identification information may be carried in the PSSCH with reference to the puncturing or rate matching manner for the feedback information and/or the measurement information as described in the method embodiment, and the adopted method is the same as that in the method embodiment and will not be elaborated herein.

In an implementation mode, the device further includes the resource sensing unit 403 configured to perform resource sensing to determine at least one available resource, and select a resource for transmitting the PSSCH from the at least one available resource.

In an implementation mode, the device further includes the resource determination unit 404 configured to determine the resource for transmitting the PSSCH based on the transmission resource corresponding to the data sent by the second terminal or determine the resource for transmitting the PSSCH based on the transmission resource corresponding to the measurement signal sent by the second terminal.

In an implementation mode, the device further includes the resource determination unit 404 configured to determine the resource for transmitting the PSSCH based on third indication information sent by the second terminal, the third indication information being carried in the data sent by the second terminal or the third indication information being carried in control information corresponding to the data sent by the second terminal.

In an implementation mode, the feedback information includes at least one of:

ACK/NACK information, beam index information, CQI information, PMI information, RI information, power indication information or CSI information.

In an implementation mode, when the feedback information includes the ACK/NACK information, the feedback information further includes HARQ process information. Herein, the ACK/NACK information indicates ACK information or NACK information.

In an implementation mode, the measurement information includes at least one of:

RSRP, RSRQ, RSSI, interference indication information or path loss information.

Those skilled in the art should know that functions realized by various units in the data transmission device shown in FIG. 4 may be understood with reference to related descriptions about the data transmission method. The functions of various units in the data transmission device shown in FIG. 4 may be realized through a program running in a processor, and may also be realized through a specific logical circuit.

The technical solutions of the embodiments of the disclosure are not only applied to a V2X system but also applied to other D2D communication systems. In the embodiments of the disclosure, the terminal may be a vehicle terminal, a handheld terminal, a Personal Digital Assistant (PDA), a wearable terminal and the like.

When being implemented in form of software functional modules and sold or used as an independent product, the data transmission device of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which computer-executable instructions are stored, where the computer-executable instructions, when being executed by a processor, enable the processor to implement the data transmission method of the embodiments of the disclosure.

Figure 5:
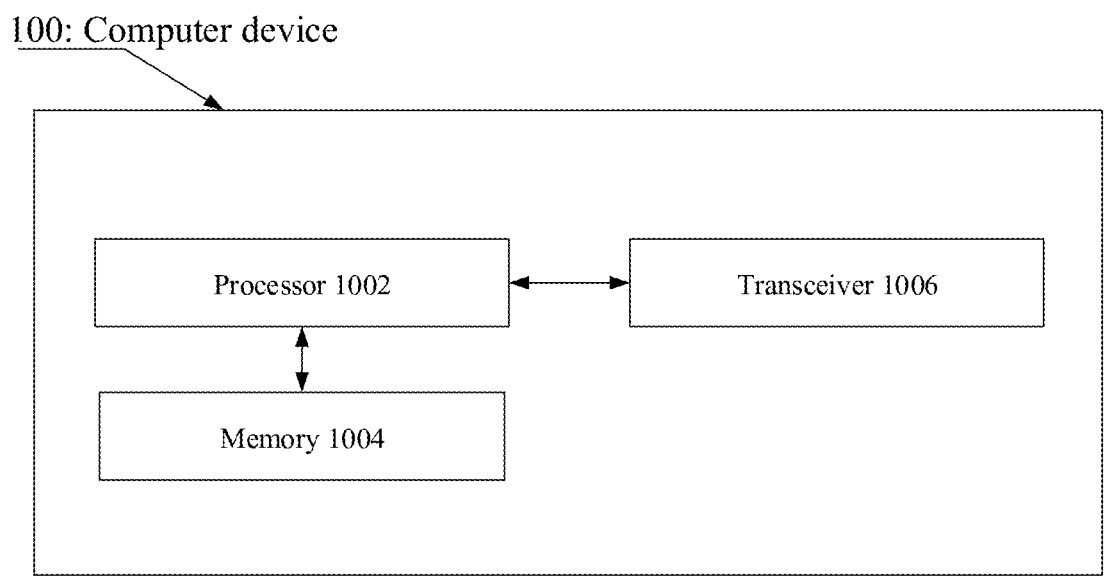
FIG. 5 is a structure composition diagram of a computer device according to some embodiments of the disclosure.

FIG. 5 is a structure composition diagram of a computer device according to an embodiment of the disclosure. The computer device of the embodiment of the disclosure may be a terminal of any type. As shown in FIG. 5, the computer device 100 may include one or more (only one is shown in the figure) processors 1002 (the processor 1002 may include, but not limited to, a processing device such as a Micro Controller Unit (MCU) or a Field Programmable Gate Array (FPGA)), a memory 1004 configured to store data and a transceiver 1006 configured for a communication function. The one or more processors 1002 may be configured to execute the instructions stored in the memory 1004 to control the transceiver 1006 to receive and/or send data according to the data transmission method of the present disclosure. Those of ordinary skill in the art should know that the structure shown in FIG. 5 is only schematic and not intended to limit the structure of the electronic device. For example, the computer device 100 may further include more or fewer components than the components shown in FIG. 5 or has a configuration different from that shown in FIG. 5.

The memory 1004 may be configured to store a software program of application software and a module, for example, a program instruction/module corresponding to a data transmission method in the embodiments of the disclosure. The processor 1002 runs the software program and module stored in the memory 1004, thereby executing various functional applications and data processing, namely implementing the abovementioned method. The memory 1004 may include a high-speed random access memory and may also include a nonvolatile memory, for example, one or more magnetic storage devices, flash memories or other nonvolatile solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network and a combination thereof.

The transceiver 1006 is configured to receive or send data through a network. A specific example of the network may include a wireless network provided by a communication provider of the computer device 100. In an example, the transceiver 1006 includes a Network Interface Controller (NIC), which may be connected with another network device through a base station, thereby communicating with the Internet. In an example, the transceiver 1006 may be a Radio Frequency (RF) module, configured to communicate with the Internet in a wireless manner.

The technical solutions disclosed in the embodiments of the disclosure may be freely combined without conflicts.

In some embodiments provided by the disclosure, it is to be understood that the disclosed method and intelligent device may be implemented in another manner The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit and two or more than two units may also be integrated into a unit. The integrated unit may be implemented in a hardware form and may also be implemented in form of hardware and software functional unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A method for data transmission, comprising:
receiving, by a first terminal, data sent by a second terminal; and
sending, by the first terminal, a Physical Sidelink Feedback Channel (PSFCH) to the second terminal, the PSFCH comprising feedback information corresponding to the data sent by the second terminal,
wherein the PSFCH is used to send only the feedback information, the feedback information sent in the PSFCH is carried by a sequence, and the PSFCH is not a Physical Sidelink Shared Channel (PSSCH) nor a Physical Sidelink Control Channel (PSCCH).

2. The method of claim 1, further comprising:
sending, by the first terminal, measurement information to the second terminal through a Media Access Control (MAC) Control Element (CE) in the PSSCH, the MAC CE comprising the measurement information.

3. The method of claim 1, further comprising:
receiving, by the first terminal, indication information carried in data sent by the second terminal, wherein the indication information is used to determine resources for transmitting the PSSCH.

4. The method of claim 1, wherein a frequency-domain transmission resource for the PSFCH is determined based on a lowest sub-band where the data is located.

5. The method of claim 1, wherein a time-domain transmission resource for the PSFCH is determined based on a subframe where the data is located.

6. The method of claim 1, wherein the feedback information includes Acknowledgement (ACK) information or Negative Acknowledgement (NACK) information.

7. The method of claim 1, wherein the PSFCH is mapped in only one symbol.

8. The method of claim 1, wherein a transmission resource for PSFCH is selected in a sensing manner and from an available resource set.

9. The method of claim 1, wherein the PSFCH and the data received from the second terminal by the first terminal are positioned in a same subframe or slot.

10. A device for data transmission, applied to a first terminal and comprising: one or more processors, a memory configured to store instructions executable by the one or more processors, and a transceiver, wherein
the one or more processors are configured to control the transceiver to:
receive data sent by a second terminal; and
send a Physical Sidelink Feedback Channel (PSFCH) to the second terminal, the PSFCH comprising feedback information corresponding to the data sent by the second terminal,
wherein the PSFCH is used to send only the feedback information, the feedback information sent in the PSFCH is carried by a sequence, and the PSFCH is not a Physical Sidelink Shared Channel (PSSCH) nor a Physical Sidelink Control Channel (PSCCH).

11. The device of claim 10, wherein one or more processors are configured to control the transceiver to:
send measurement information to the second terminal through a Media Access Control (MAC) Control Element (CE) in the PSSCH, the MAC CE comprising the measurement information.

12. The device of claim 10, wherein the one or more processors are configured to control the transceiver to:
receive indication information carried in data sent by the second terminal, wherein the indication information is used to determine resources for transmitting the PSSCH.

13. The device of claim 10, wherein a frequency-domain transmission resource for the PSFCH is determined based on a lowest sub-band where the data is located.

14. The device of claim 10, wherein a time-domain transmission resource for the PSFCH is determined based on a subframe where the data is located.

15. The device of claim 10, wherein the feedback information includes Acknowledgement (ACK) information or Negative Acknowledgement (NACK) information.

16. The device of claim 10, wherein the PSFCH is mapped in only one symbol.

17. The device of claim 10, wherein a transmission resource for PSFCH is selected in a sensing manner and from an available resource set.

18. The device of claim 10, wherein the PSFCH and the data received from the second terminal by the first terminal are positioned in a same subframe or slot.

19. A non-transitory computer storage medium, having stored thereon computer-executable instructions, wherein the computer-executable instructions, when being executed by a processor, enable the processor to implement a method for data transmission, the method applied to a first terminal and comprising:
receiving data sent by a second terminal; and
sending a Physical Sidelink Feedback Channel (PSFCH) to the second terminal, the PSFCH comprising feedback information corresponding to the data sent by the second terminal,
wherein the PSFCH is used to send only the feedback information, the feedback information sent in the PSFCH is carried by a sequence, and the PSFCH is not a Physical Sidelink Shared Channel (PSSCH) nor a Physical Sidelink Control Channel (PSCCH).

* * * * *